(12) United States Patent
Lu et al.

(10) Patent No.: US 11,036,996 B2
(45) Date of Patent: Jun. 15, 2021

(54) METHOD AND APPARATUS FOR DETERMINING (RAW) VIDEO MATERIALS FOR NEWS

(71) Applicant: Baidu USA LLC, Sunnyvale, CA (US)

(72) Inventors: Daming Lu, Sunnyvale, CA (US); Hao Tian, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 0 days.

(21) Appl. No.: 16/460,319

(22) Filed: Jul. 2, 2019

(65) Prior Publication Data
US 2021/0004603 A1    Jan. 7, 2021

(51) Int. Cl.
| | |
|---|---|
| *H04N 9/80* | (2006.01) |
| *G06K 9/00* | (2006.01) |
| *G11B 27/22* | (2006.01) |
| *G11B 27/031* | (2006.01) |
| *G06F 40/295* | (2020.01) |

(52) U.S. Cl.
CPC ....... *G06K 9/00744* (2013.01); *G06F 40/295* (2020.01); *G06K 9/00221* (2013.01); *G06K 9/00348* (2013.01); *G06K 9/00362* (2013.01); *G06K 9/00765* (2013.01); *G11B 27/031* (2013.01); *G11B 27/22* (2013.01)

(58) Field of Classification Search
USPC .................................................. 386/241, 248
See application file for complete search history.

(56) References Cited

U.S. PATENT DOCUMENTS

| | | | | |
|---|---|---|---|---|
| 10,140,518 | B1* | 11/2018 | Williams | G06K 9/00744 |
| 2002/0188621 | A1* | 12/2002 | Flank | G06F 16/5846 |
| 2003/0033347 | A1* | 2/2003 | Bolle | G06F 16/7834 |
| | | | | 718/107 |
| 2004/0228616 | A1* | 11/2004 | Miyasato | H04N 21/4312 |
| | | | | 386/262 |
| 2006/0288291 | A1* | 12/2006 | Lee | H04N 5/147 |
| | | | | 715/723 |
| 2009/0190804 | A1* | 7/2009 | Yokoi | G11B 27/28 |
| | | | | 382/118 |
| 2010/0074590 | A1* | 3/2010 | Momosaki | G11B 27/034 |
| | | | | 386/278 |
| 2010/0104144 | A1* | 4/2010 | Momosaki | G06K 9/00711 |
| | | | | 382/118 |
| 2011/0033113 | A1* | 2/2011 | Sakaguchi | G06F 16/70 |
| | | | | 382/190 |
| 2011/0064319 | A1* | 3/2011 | Momosaki | G11B 27/34 |
| | | | | 382/224 |
| 2012/0106806 | A1* | 5/2012 | Folta | G06K 9/00295 |
| | | | | 382/118 |

(Continued)

*Primary Examiner* — Nigar Chowdhury
(74) *Attorney, Agent, or Firm* — Nixon Peabody LLP

(57) ABSTRACT

The present disclosure discloses a method and apparatus for determining video material of news. The method for determining video material of news comprises: recognizing a person name in a news text; searching a video based on the person name, to obtain a to-be-selected video; extracting a key frame in the to-be-selected video; recognizing a person in the key frame to obtain identity information of the person; and determining the to-be-selected video as video material of news, in response to the identity information of the person conforming to the person name. The present disclosure improves the consistency between the video material of the news and the news text.

13 Claims, 6 Drawing Sheets

(56) References Cited

U.S. PATENT DOCUMENTS

| | | | | |
|---|---|---|---|---|
| 2012/0177292 | A1* | 7/2012 | Cheon | H04N 21/43615 382/190 |
| 2013/0262588 | A1* | 10/2013 | Barak | G06K 9/00221 709/204 |
| 2013/0265495 | A1* | 10/2013 | Yang | H04N 5/272 348/586 |
| 2014/0355883 | A1* | 12/2014 | Li | G06T 5/003 382/176 |
| 2015/0016804 | A1* | 1/2015 | Biderman | H04N 21/6587 386/343 |
| 2015/0067077 | A1* | 3/2015 | DiSano | H04L 51/32 709/206 |
| 2015/0246302 | A1* | 9/2015 | Petit | B01D 33/11 210/780 |
| 2016/0014482 | A1* | 1/2016 | Chen | H04N 21/26258 386/241 |
| 2018/0061256 | A1* | 3/2018 | Elchik | G09B 7/06 |
| 2018/0075877 | A1* | 3/2018 | Cilingir | G11B 27/034 |
| 2018/0173939 | A1* | 6/2018 | Howe | G06K 9/00288 |
| 2018/0174600 | A1* | 6/2018 | Chaudhuri | G06K 9/00744 |
| 2018/0176661 | A1* | 6/2018 | Varndell | G06F 40/197 |
| 2020/0019583 | A1* | 1/2020 | Halfond | G06F 16/986 |
| 2020/0184007 | A1* | 6/2020 | Shah | G06F 16/213 |
| 2020/0395008 | A1* | 12/2020 | Cohen | G06F 40/205 |

* cited by examiner

METHOD AND APPARATUS FOR DETERMINING (RAW) VIDEO MATERIALS FOR NEWS

TECHNICAL FIELD

The present disclosure relates to the field of media technology, specifically to the field of news media technology, and more specifically to a method and apparatus for determining video material of news.

BACKGROUND

Artificial Intelligence is abbreviated as AI in English. AI is a new technical science that researches and develops theories, methods, techniques and application systems for simulating, extending and expanding human intelligence. AI is a branch of computer science, and it attempts to understand the essence of intelligence and produce a new intelligent machine that can respond in a way similar to the human intelligence. The research in this field include robotics, language recognition, image recognition, natural language processing, expert systems, etc.

When news is produced, for a news text, video material matching the news text needs to be provided. At present, the video material matching the news text is mainly manually looked up. Specifically, for a news text (including the full text of news and/or the summary paragraph in the full text of the news) that needs to be equipped with a video, the video content is manually browsed, and the video material of the video is manually selected according to the content of the news text, to complete the production of the news.

SUMMARY

Embodiments of the present disclosure provide a method and apparatus for determining video material of news.

In a first aspect, the embodiments of the present disclosure provide a method for determining video material of news. The method includes: recognizing a person name in a news text; searching a video based on the person name, to obtain a to-be-selected video; extracting a key frame in the to-be-selected video; recognizing a person in the key frame to obtain identity information of the person; and determining the to-be-selected video as video material of news, in response to the identity information of the person conforming to the person name.

In some embodiments, the recognizing a person name in a news text includes: recognizing the person name in the news text using named entity recognition; recognizing the person name in the news text using a jieba word segmentation system; or recognizing the person name in the news text based on a rule set of the recognizing on the person name.

In some embodiments, the recognizing a person in the key frame to obtain identity information of the person includes: recognizing at least one of a face, voice, a body shape or a gait of the person in the key frame, to obtain the identity information of the person.

In some embodiments, the method further includes: segmenting, in response to a play duration of the video material of the news exceeding a play duration required by the news, the video material of the news based on a video frame having a changed scene in the video material of the news; and updating the video material of the news using the segmented video material.

In some embodiments, the method further includes: playing the video material of the news when the news text is broadcasted.

In some embodiments, the news text includes: a full text of the news and/or a summary paragraph in the full text of the news.

In a second aspect, the embodiments of the present disclosure provide an apparatus for determining video material of news. The apparatus includes: a text recognizing unit, configured to recognize a person name in a news text; a searching unit, configured to search a video based on the person name, to obtain a to-be-selected video; an extracting unit, configured to extract a key frame in the to-be-selected video; an identity recognizing unit, configured to recognize a person in the key frame to obtain identity information of the person; and a determining unit, configured to determine the to-be-selected video as video material of news, in response to the identity information of the person conforming to the person name.

In some embodiments, the text recognizing unit is further configured to: recognize the person name in the news text using named entity recognition; recognize the person name in the news text using a jieba word segmentation system; or recognize the person name in the news text based on a rule set of the recognizing on the person name.

In some embodiments, the identity recognizing unit is further configured to: recognize at least one of a face, voice, a body shape or a gait of the person in the key frame, to obtain the identity information of the person.

In some embodiments, the apparatus further includes: a segmenting unit, configured to segment, in response to a play duration of the video material of the news exceeding a play duration required by the news, the video material of the news based on a video frame having a changed scene in the video material of the news; and an updating unit, configured to update the video material of the news using the segmented video material.

In some embodiments, the apparatus further includes: a playing unit, configured to play the video material of the news when the news text is broadcasted.

In some embodiments, the news text recognized in the text recognizing unit includes: a full text of the news and/or a summary paragraph in the full text of the news.

In a third aspect, the embodiments of the present disclosure provide an electronic device/terminal/server, including one or more processors; and a storage device, configured to store one or more programs. The one or more programs, when executed by the one or more processors, cause the one or more processors to implement the method described in any embodiment.

In a fourth aspect, the embodiments of the present disclosure provide a computer readable medium storing a computer program. The program, when executed by a processor, implements the method described in any embodiment.

In a fifth aspect, the embodiments of the present disclosure provide a server. The server includes: an interface; a storage device, storing one or more programs; and one or more processors, operatively connected to the interface and the storage device to: recognize a person name in a news text; search a video based on the person name, to obtain a to-be-selected video; extract a key frame in the to-be-selected video; recognize a person in the key frame to obtain identity information of the person; and determine the to-be-selected video as video material of news, in response to the identity information of the person conforming to the person name.

In a sixth aspect, the embodiments of the present disclosure provide a computer readable storage medium, storing a computer program. The computer program, when executed by one or more processors, causes the one or more processors to: recognize a person name in a news text; search a video based on the person name, to obtain a to-be-selected video; extract a key frame in the to-be-selected video; recognize a person in the key frame to obtain identity information of the person; and determine the to-be-selected video as video material of news, in response to the identity information of the person conforming to the person name.

According to the method and apparatus for determining video material of news provided by the embodiments of the present disclosure, the person name in the news text is first recognized; the video is searched based on the person name to obtain the to-be-selected video; the key frame in the to-be-selected video is extracted; the person in the key frame is recognized to obtain the identity information of the person; and the to-be-selected video is determined as the video material of the news, in response to the identity information of the person conforming to the person name. According to the method for determining video material of news, when the video material of the news is determined, whether the to-be-selected video meets the requirements of the news text is determined according to whether the recognition result of the person in the key frame conforms to the person name in the news text. Therefore, it may be avoided that the person in the to-be-selected video is not related to the person name in the news text, and the video material of the news is then determined according to the to-be-selected video, thus improving the fit between the video material of the news and the news text.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail by combining the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

It should be noted that the modifications "a" and "a plurality of" mentioned in the present disclosure are illustrative, rather than restrictive. It should be understood by those skilled in the art that "a" and "a plurality of" should be understood as "one or more," unless explicitly stated otherwise in the context.

Figure 1:
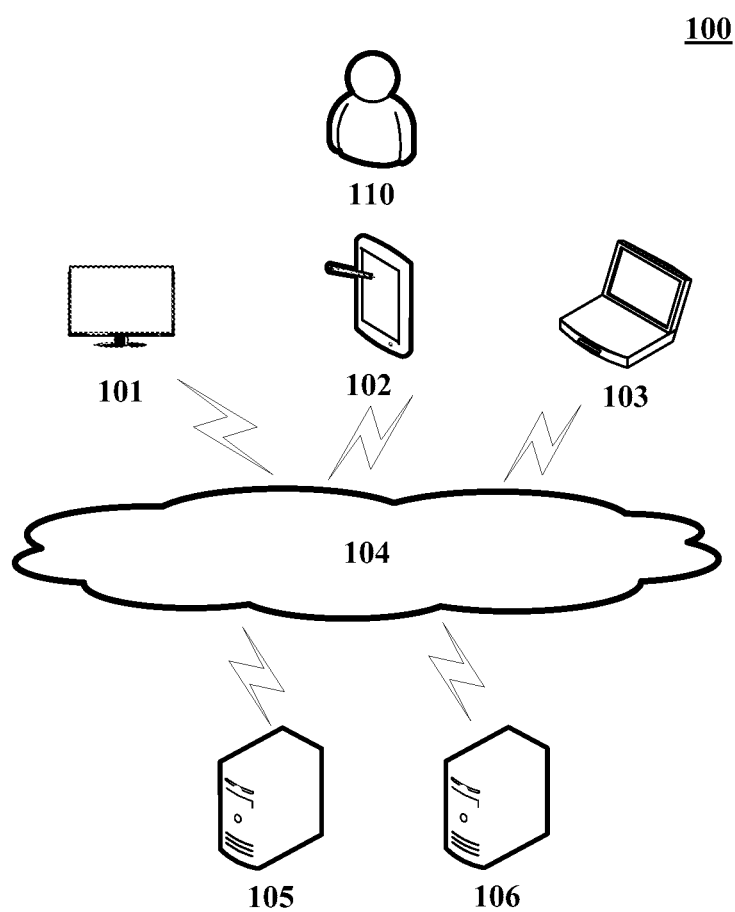
FIG. 1 is a diagram of an exemplary system architecture in which some embodiments of the present disclosure may be applied.

FIG. 1 shows a method and apparatus for determining video material of news in which embodiments of the present disclosure may be applied, and an exemplary system architecture 100 of the method and apparatus for determining video material of news.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 by using the terminal devices 101, 102 and 103, to receive or send messages. Various communication client applications (e.g., a search application, a deep learning application, a shopping application, an instant communication tool, a mailbox client and social platform software) may be installed on the terminal devices 101, 102 and 103.

The terminal devices 101, 102 and 103 may be hardware or software. When being the hardware, the terminal devices 101, 102 and 103 may be various electronic devices supporting various client applications, the electronic devices including, but not limited to, a tablet computer, a laptop portable computer and a desktop computer. When being the software, the terminal devices 101, 102 and 103 may be installed in the above-listed electronic devices. The terminal devices may be implemented as, for example, a plurality of pieces of software or a plurality of software modules for providing a distributed service, or as a single piece of software or a single software module, which will not be specifically defined here.

The server 105 may be a server providing various kinds of services, for example, a backend server providing support for a video search performed on the terminal devices 101, 102 and 103. The backend server may process (e.g., analyze) data such as a received search request, and feedback the processing result to the terminal devices.

It should be noted that, in practice, the method for determining video material of news provided by the embodiments of the present disclosure may be performed by the terminal devices 101, 102 and 103, or may be performed by the server 105. Correspondingly, the apparatus for determining video material of news may be provided in the terminal devices 101, 102 and 103, or may be provided in the server 105, which will not be specifically defined here.

It should be noted that the server may be hardware or software. When being the hardware, the server may be implemented as a distributed server cluster composed of a plurality of servers, or as a single server. When being the software, the server may be implemented as, for example, a plurality of pieces of software or a plurality of software modules for providing a distributed service, or as a single piece of software or a single software module, which will not be specifically defined here.

It should be appreciated that the numbers of the terminal devices, the networks, and the servers in FIG. 1 are merely illustrative. Any number of terminal devices, networks and servers may be provided based on actual requirements.

Figure 2:
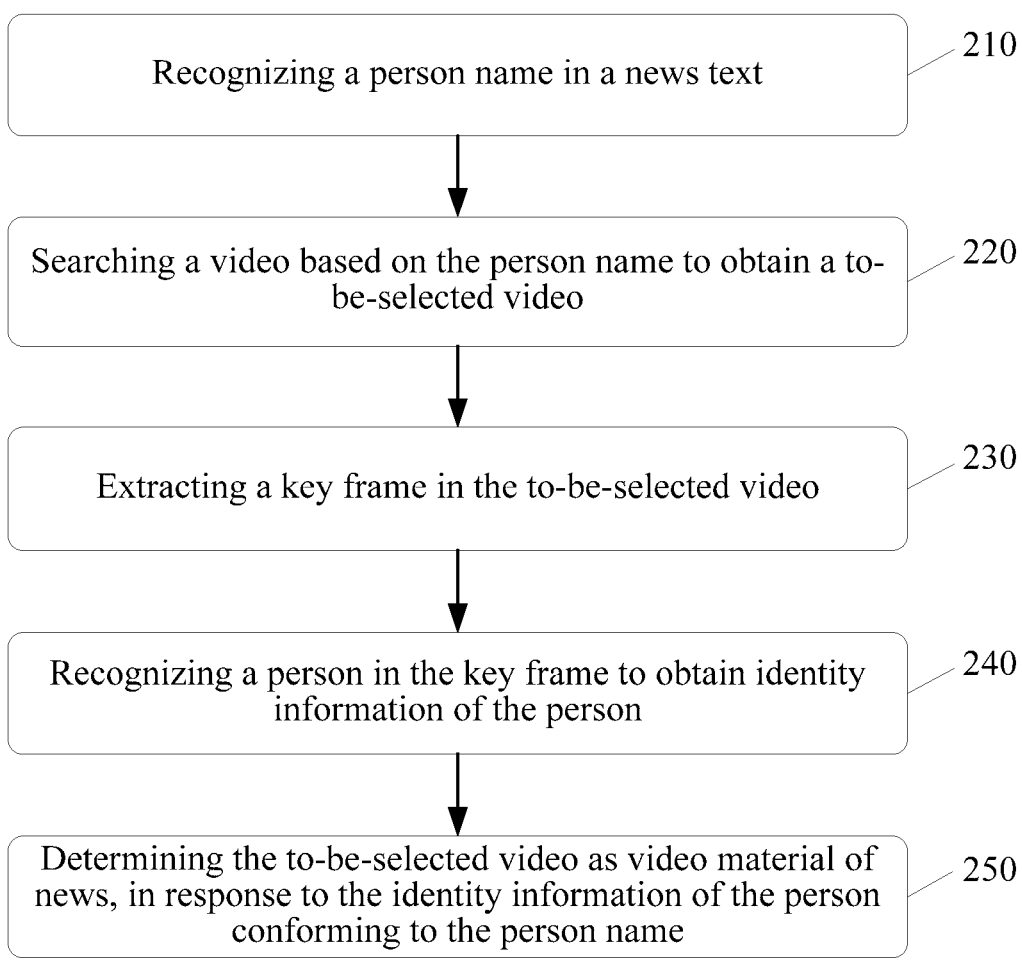
FIG. 2 is an exemplary flowchart of some embodiments of a method for determining video material of news according to the present disclosure.

Further referring to FIG. 2, FIG. 2 is a schematic flowchart of some embodiments of a method for determining video material of news according to the present disclosure.

As shown in FIG. 2, the method 200 for determining video material of news includes the following steps:

Step 210, recognizing a person name in a news text.

In this embodiment, an executing body (e.g., the terminal or server shown in FIG. 1) of the method for determining video material of news may recognize the person name in the news text using a method for recognizing a person name in a text in the existing technology or a technology developed in the future, which will not be limited in the present disclosure.

In some specific examples, automatic recognition on the person name based on a HanLP framework may be used. Specifically, for a given sentence, the following three steps are first performed. The character observation is first performed, and a hidden state is then solved (i.e., a character token for each segmented word is solved) using a Viterbi algorithm. Next, maximum matching is performed on the character token (some post-processing operations may be performed). Finally, a word segmentation is performed using the Viterbi algorithm again, to obtain a segmentation result, which is the final recognition result.

In some alternative implementations of this embodiment, the recognizing a person name in a news text may include: recognizing the person name in the news text using named entity recognition.

In this implementation, the named entity recognition (NER) is to recognize a nomenclature reference item from the news text. Narrow named entity recognition is to recognize three types of named entities: person name, place name, and organization name (an type of entity such as time and currency names having an obvious regularity of composition may be recognized using a regular expression, etc.). In a particular field, various entity types that need to be recognized in the field may be correspondingly defined.

The named entity recognition may be implemented using a method of recognizing an entity in a text in the existing technology or a technology developed in the future, which will not be limited in the present disclosure. For example, the named entity recognition may complete the recognition on an entity in the news text using any of: a rule based method, a feature template based method, and a neural network based method.

Specifically, the rule based method may be to match, based on a manually written rule, the text and the rule to recognize a named entity. For example, for Chinese, a recognition rule may include: words such as "say" and "teacher" may be followed by the person name; and words such as "university" and "hospital" may be used as the end of the organization name. The recognition rule may further include: part-of-speech information; syntactic information, etc. The recognition rules of different languages constructed based on linguistic knowledge are not the same, and thus the conflict between the rules needs to be taken into consideration.

For the feature template based method, NER may be regarded as a sequence labeling task through statistics on machine learning methods, and a labeling model may be learned using a large-scale corpus, so as to label each position of the sentence. Commonly used models applied to an NER task include a generative model (e.g., a hidden Markov model (HMM)), a discriminant model (e.g., a conditional random field model (CRF)), etc.

In some examples, the named entity recognition may be implemented using a scheme (feature template+CRF). Here, the feature template usually refers to a manually defined binary feature function, attempting to mine the internal and contextual composition characteristics of the named entity. For a given position in the sentence, a position at which a feature is extracted is a window, i.e., a context position. Moreover, a new feature template may be formed by combining different feature templates.

Here, in the process of labeling a position, by using the information that is already labeled, the CRF may use Viterbi decoding to obtain an optimal sequence. When a feature is extracted at each position in the sentence, the value of a feature satisfying a condition is taken as 1, and the value of a feature not satisfying the condition is taken as 0. Next, the extracted feature is inputted into the CRF, and the shift of a modeling tag is implemented in the model training phase. Then, the each position of the inputted news text is labeled in the prediction phase.

According to the neural network based method, the approach to processing the sequence labeling task NER is to map the token from a discrete one-hot representation into low-dimensional space to become dense embedding. Then, an embedding sequence of the sentence is inputted into an RNN, and the feature is automatically extracted using a neural network. Next, a tag of each token is predicted using a Softmax.

By using the named entity recognition methods, the named entity recognition may be accurately and efficiently performed on the news text, to obtain the person name of in the news text.

In some alternative implementations of this embodiment, the recognizing a person name in a news text may include: recognizing the person name in the news text using a jieba word segmentation system.

In this implementation, the jieba word segmentation system implements the word segmentation based on a prefix dictionary and a dynamic programming method. When the word segmentation is performed on the news text using the HMM model, the word segmentation problem is mainly regarded as a sequence labeling problem. Here, a sentence in the news text is an observation sequence, and a word segmentation result is a state sequence. First, an HMM-related model is trained through the corpus, then a solution is derived using the Viterbi algorithm, and the most likely state sequence is finally obtained. Then, pattern matching is performed on the state sequence and a person name pattern string, to find the person name in the news text, and output the person name in the news text.

In this implementation, the jieba word segmentation system is used to recognize the person name in the news text, which may improve the efficiency and the accuracy of the recognition on the person name.

In some alternative implementations of this embodiment, the recognizing a person name in a news text may include: recognizing the person name in the news text based on a rule set of the recognizing on the person name.

In this implementation, when the person name in the news text is determined based on the rule set of the recognizing on the person name, the rule set may be first established based on at least one of the following information of a word for a name: frequency information, context information, corpus statistical information, and part-of-speech information. Then, the person name in the news text is determined based on the rule set.

In some specific examples, the composition of a Chinese person name, the regularity of words for names, and the feature of contextual text information may first be fully analyzed. On this basis, two rule sets are established. The two rule sets are applied to a test text to obtain a preliminary recognition result. The probability filtering is then performed on the preliminary recognition result using the statistical information of a large-scale corpus. An appropriate threshold is set to output the final recognition result.

In this implementation, the person name in the news text is recognized based on the rule set of the recognizing on the person name, which may improve the accuracy of the recognition on the person name.

The news text may include a full text of the news. Alternatively or additionally, the news text may include a summary paragraph in the full text of the news. Here, the summary paragraph refers to a paragraph in the full text of the news, the paragraph providing an outline for the content of the news.

Step 220, searching a video based on the person name to obtain a to-be-selected video.

In this embodiment, by using the person name as a keyword, the to-be-selected video may be searched in a video library via a webpage, an application program, or other call interfaces.

The video library here may be a video library provided by a video provider. Alternatively, the video library may be a video library provided by a search engine and including an Internet video resource, which will not be limited in the present disclosure.

Step 230, extracting a key frame in the to-be-selected video.

In this embodiment, after the to-be-selected video is searched, in order to verify whether the to-be-selected video is a video meeting the needs of the news text, the key frame in the to-be-selected video may be extracted so as to determine whether a human face in the key frame conforms to the person name in the news text.

Here, the key frame refers to a frame in which a key action of the movement or change of a character or object occurs. Alternatively, the key frame refers to a video frame extracted from the to-be-selected video at an interval of a predetermined number of frames.

Step 240, recognizing a person in the key frame to obtain identity information of the person.

In this embodiment, the executing body may use a person recognition technology in the existing technology or a technology developed in the future to recognize the person in the key frame and obtain the identity information of the person in the key frame, which will not be limited in the present disclosure.

Specifically, by applying the biometric recognition technology in the field of artificial intelligence, the person recognition is to analyze and compare the visual feature information of the person for identity authentication. The person recognition actually includes a series of related technologies of constructing a person recognition system, including a person image acquisition technology, a person positioning technology, a person recognition preprocessing technology, an identity confirmation technology, and an identity search technology. The biometric feature used in the person recognition is generally the same as that used by humans to perform individual recognition. For example, the person recognition may be completed based on at least one of the recognition processes on the biometric feature: face recognition, speech recognition, body shape recognition, and gait recognition.

For example, the person recognition technology may be implemented based on at least one of: an MMP-PCA recognition algorithm; a feature-based recognition algorithm; an appearance-based recognition algorithm; a template-based recognition algorithm; or a recognition algorithm using a neural network.

Step 250, determining the to-be-selected video as video material of news, in response to the identity information of the person conforming to the person name.

In this embodiment, if the identity information of the human face conforms to the person name recognized from the news text, it indicates that the to-be-selected video conforms to the description for the news text, and thus the to-be-selected video may be determined as the video material of the news. On the contrary, if the identity information of the human face does not conform to the person name recognized from the news text, it indicates that the to-be-selected video is only a video having the same name as the person name in the news text, and cannot accurately conform to the person name in the news text. Thus, the to-be-selected video cannot be determined as the required video material of the news.

An exemplary application scenario of the method for determining video material of news according to the present disclosure is described below in combination with FIG. 3.

Figure 3:
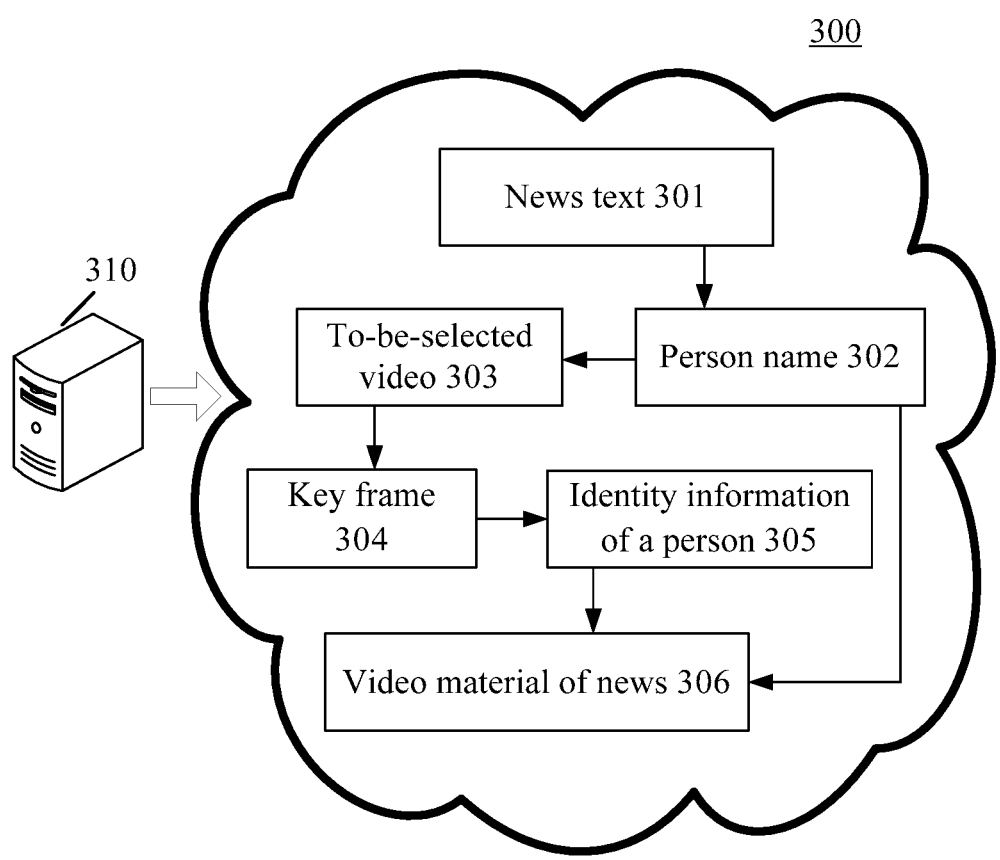
FIG. 3 is a schematic diagram of some application scenarios of the method for determining video material of news according to the embodiments of the present disclosure.

As shown in FIG. 3, FIG. 3 is a schematic flowchart of some application scenarios of the method for determining video material of news according to the present disclosure.

As shown in FIG. 3, the method 300 for determining video material of news runs in the electronic device 310, and may include:

First, the person name 302 in the news text 301 is recognized.

Then, a video is searched based on the person name 302 to obtain the to-be-selected video 303.

Next, the key frame 304 in the to-be-selected video 303 is extracted.

Then, a person in the key frame 304 is recognized to obtain the identity information 305 of the person.

Finally, the to-be-selected video 303 is determined as the video material 306 of the news, in response to the identity information 305 of the person conforming to the person name 302.

It should be understood that the application scenario of the method for determining video material of news shown in FIG. 3 is merely an exemplary description for the method for determining video material of news, and does not represent a limitation to the method. For example, when the person name 302 in the news text 301 is recognized, the person name in the news text may be recognized using a method for recognizing a person name in a text in the existing technology or a technology developed in the future, which will not be limited in the present disclosure.

According to the method for determining video material of news provided by the above embodiments of the present disclosure, when the video material of the news is determined, whether the to-be-selected video meets the requirements of the news text is determined according to whether the recognition result of the person in the key frame conforms to the person name in the news text. Therefore, it may be avoided that the person in the to-be-selected video is not related to the person name in the news text, and the video material of the news is then determined according to the to-be-selected video, thus improving the fit between the video material of the news and the news text.

Figure 4:
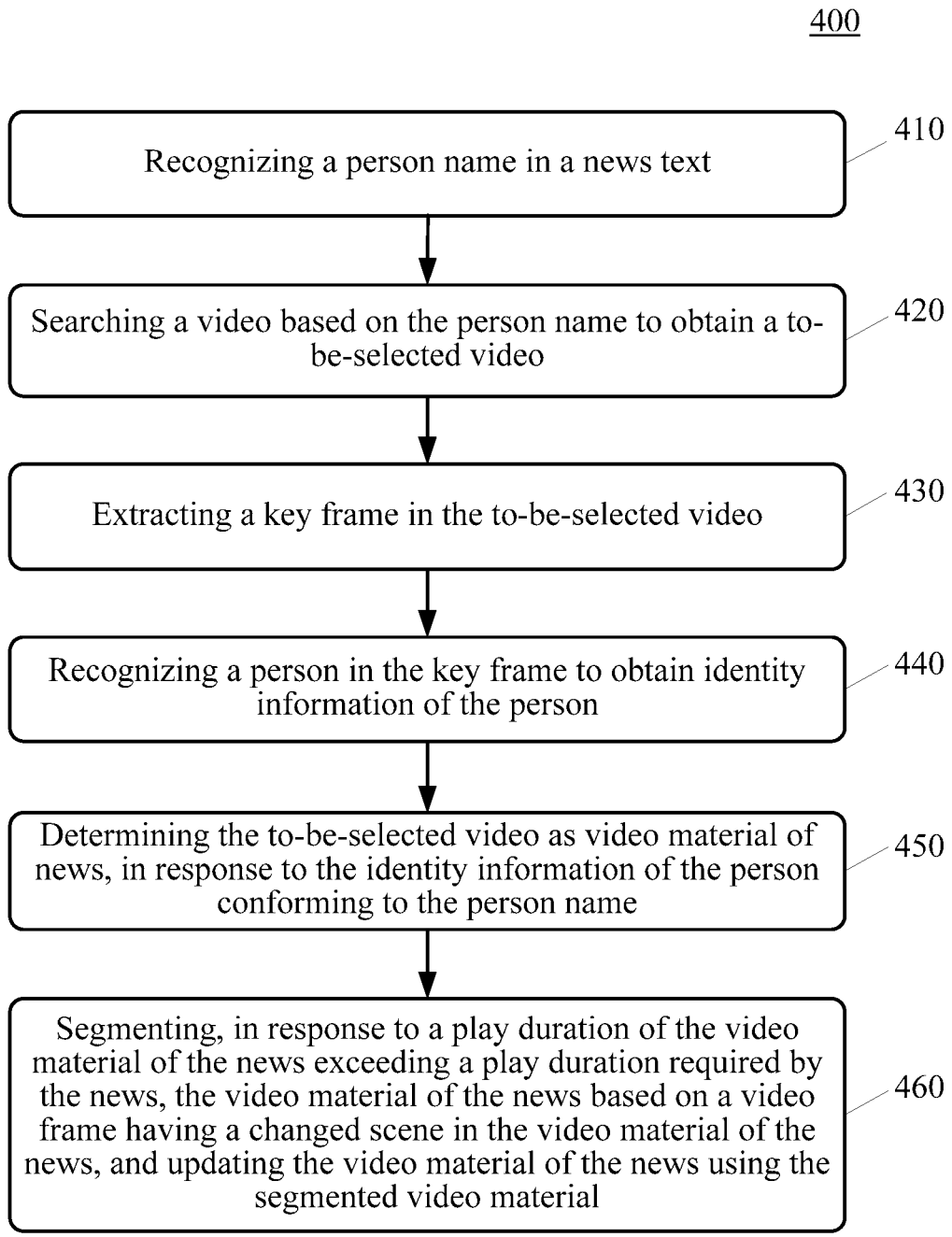
FIG. 4 is an exemplary flowchart of some embodiments of the method for determining video material of news according to the present disclosure.

Referring to FIG. 4, FIG. 4 is an exemplary flowchart of some embodiments of the method for determining video material of news according to the present disclosure.

As shown in FIG. 4, the method 400 for determining video material of news in this embodiment may include:

Step 410, recognizing a person name in a news text.

In this embodiment, an executing body (e.g., the terminal or server shown in FIG. 1) of the method for determining video material of news may recognize the person name in the news text using a method for recognizing a person name in a text in the existing technology or a technology developed in the future, which will not be limited in the present disclosure.

In some specific examples, automatic recognition on the person name based on a HanLP framework may be used. Specifically, for a given sentence, the following three steps are first performed. The character observation is first performed, and a hidden state is then solved (i.e., a character token for each segmented word is solved) using a Viterbi algorithm. Next, maximum matching is performed on the character token (some post-processing operations may be performed). Finally, a word segmentation is performed using the Viterbi algorithm again, to obtain a segmentation result, which is the final recognition result.

Step 420, searching a video based on the person name to obtain a to-be-selected video.

In this embodiment, by using the person name as a keyword, the to-be-selected video may be searched in a video library via a webpage, an application program, or other call interfaces.

The video library here may be a video library provided by a video provider. Alternatively, the video library may be a video library provided by a search engine and including an Internet video resource, which will not be limited in the present disclosure.

Step 430, extracting a key frame in the to-be-selected video.

In this embodiment, after the to-be-selected video is searched, in order to verify whether the to-be-selected video is a video meeting the needs of the news text, the key frame in the to-be-selected video may be extracted so as to determine whether a human face in the key frame conforms to the person name in the news text.

Here, the key frame refers to a frame in which a key action of the movement or change of a character or object occurs. Alternatively, the key frame refers to a video frame extracted from the to-be-selected video at an interval of a predetermined number of frames.

Step 440, recognizing a person in the key frame to obtain identity information of the person.

In this embodiment, the executing body may use a person recognition technology in the existing technology or a technology developed in the future, to recognize the person in the key frame and obtain the identity information of the person in the key frame, which will not be limited in the present disclosure.

Specifically, by applying the biometric recognition technology in the field of artificial intelligence, the person recognition is to analyze and compare the visual feature information of the person for identity authentication. The person recognition actually includes a series of related technologies of constructing a person recognition system, including a person image acquisition technology, a person positioning technology, a person recognition preprocessing technology, an identity confirmation technology, and an identity search technology. The biometric feature used in the person recognition is generally the same as that used by humans to perform individual recognition. For example, the person recognition may be completed based on at least one of the recognition processes on the biometric feature: face recognition, speech recognition, body shape recognition, and gait recognition.

Step 450, determining the to-be-selected video as video material of news, in response to the identity information of the person conforming to the person name.

In this embodiment, if the identity information of the human face conforms to the person name recognized from the news text, it indicates that the to-be-selected video conforms to the description for the news text, and thus the to-be-selected video may be determined as the video material of the news. On the contrary, if the identity information of the human face does not conform to the person name recognized from the news text, it indicates that the to-be-selected video is only a video having the same name as the person name in the news text, and cannot accurately conform to the person name in the news text. Thus, the to-be-selected video cannot be determined as the required video material of the news.

It should be understood by those skilled in the art that steps 410-450 respectively correspond to steps 210-250 in the embodiment shown in FIG. 2, and therefore, the operations and features described for steps 210-250 in FIG. 2 are also applicable to steps 410-450, which will not be repeatedly described here.

Step 460, segmenting, in response to a play duration of the video material of the news exceeding a play duration required by the news, the video material of the news based on a video frame having a changed scene in the video material of the news, and updating the video material of the news using the segmented video material.

In this embodiment, the play duration required by the news may be set by those skilled in the art according to experience or according to an application scenario, which will not be limited in the present disclosure. If the play duration of the video material of the news exceeds the play duration required by the news, the video material of the news may be segmented, to obtain the video material of the news conforming to the required play duration.

When the segmentation is performed, the video material of the news may be segmented according to the video frame having the changed scene in the video material of the news, such that the scene represented by the video material of the news obtained after the segmentation is complete, thereby improving the quality of the updated video material of the news.

The differences between the method for determining video material of news in the above embodiment of the present disclosure and the embodiment shown in FIG. 2 lie in that, on the basis of the determination of the video material of the news in FIG. 2, when the play duration of the video material of the news exceeds the play duration required by the news, the video material of the news may be segmented based on the video frame having the changed scene in the video material of the news, and the video material of the news may be updated using the segmented video material, and then, the video material of the news is played when the news text is broadcasted. According to the method for determining video material of news, it is avoided that the content of the determined video material of the news is not related to the news text, and the fit between the video material of the news and the news text is improved. In addition, the long video material of the news is segmented based on the video frame having the changed scene, and the play duration of the updated video material of the news is more applicable to the play duration required by the news.

In some alternative implementations of the above embodiments, the method for determining video material of news further includes: playing the video material of the news when the news text is broadcasted.

In this implementation, the played video material of the news is determined based on the method for determining video material of news. Therefore, the played video material of the news is more in line with the broadcasted news text.

Figure 5:
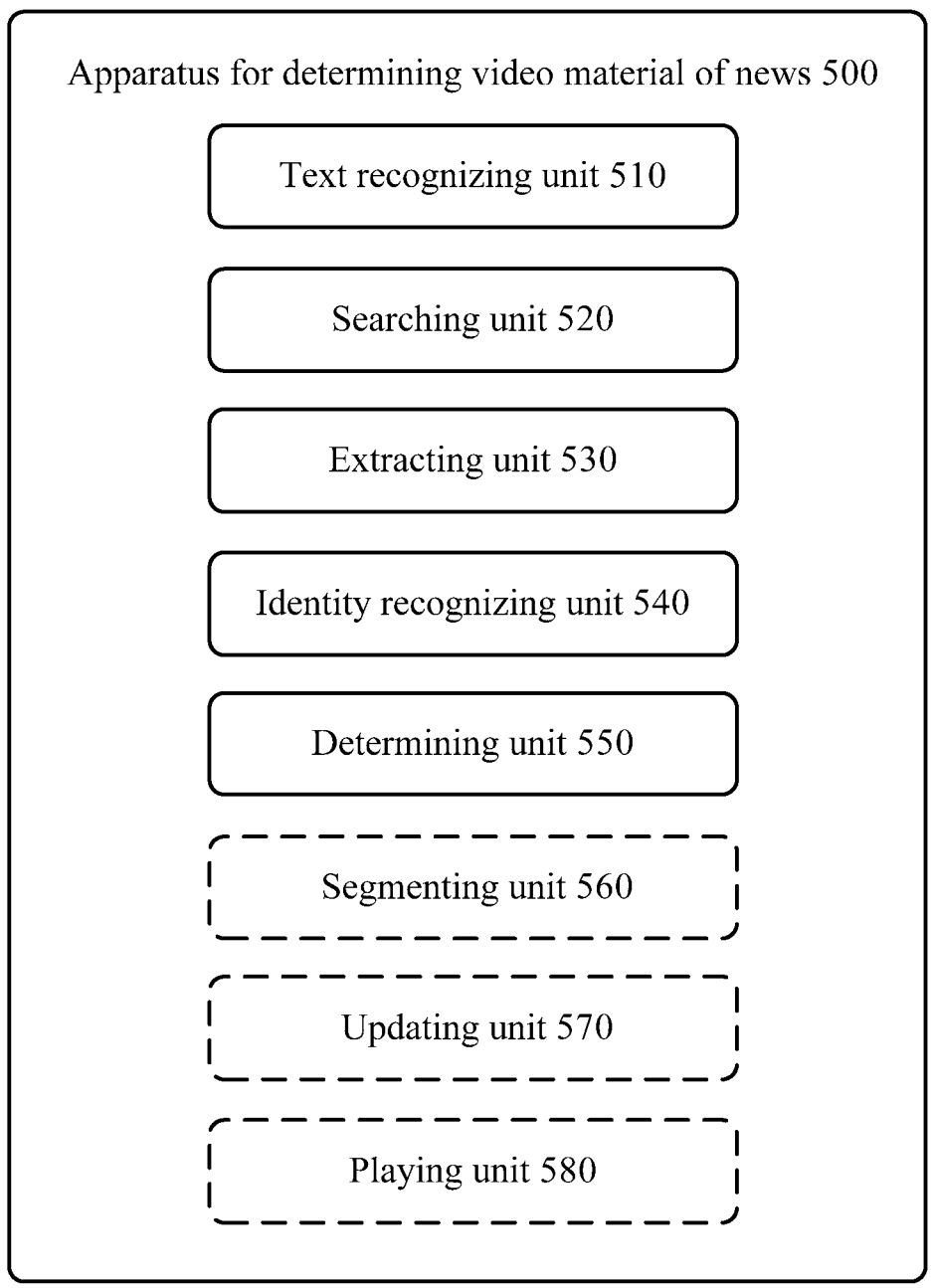
FIG. 5 is an exemplary structural diagram of some embodiments of an apparatus for determining video material of news according to the present disclosure.

Further referring to FIG. 5, as an implementation of the method shown in the above drawings, the present disclosure provides some embodiments of an apparatus for determining video material of news. The embodiments of the apparatus correspond to the embodiments of the method shown in FIGS. 2-4, and the apparatus may be applied in various electronic devices.

As shown in FIG. 5, the apparatus 500 for determining video material of news in this embodiment may include: a text recognizing unit 510, configured to recognize a person name in a news text; a searching unit 520, configured to search a video based on the person name, to obtain a to-be-selected video; an extracting unit 530, configured to extract a key frame in the to-be-selected video; an identity recognizing unit 540, configured to recognize a person in the key frame to obtain identity information of the person; and a determining unit 550, configured to determine the to-be-selected video as video material of news, in response to the identity information of the person conforming to the person name.

In some alternative implementations of this embodiment, the text recognizing unit 510 is further configured to: recognize the person name in the news text using named entity recognition; recognize the person name in the news text using a jieba word segmentation system; or recognize the person name in the news text based on a rule set of the recognizing on the person name.

In some alternative implementations of this embodiment, the identity recognizing unit 540 is further configured to: recognize at least one of a face, voice, a body shape or a gait of the person in the key frame, to obtain the identity information of the person.

In some alternative implementations of this embodiment, the apparatus further includes: a segmenting unit 560, configured to segment, in response to a play duration of the video material of the news exceeding a play duration required by the news, the video material of the news based on a video frame having a changed scene in the video material of the news; and an updating unit 570, configured to update the video material of the news using the segmented video material.

In some alternative implementations of this embodiment, the apparatus further includes: a playing unit 580, configured to play the video material of the news when the news text is broadcasted.

In some alternative implementations of this embodiment, the news text recognized in the text recognizing unit 510 includes: a full text of the news and/or a summary paragraph in the full text of the news.

The embodiments of the present disclosure further provide an electronic device/terminal/server, including one or more processors; and a storage device, configured to store one or more programs. The one or more programs, when executed by the one or more processors, cause the one or more processors to implement the method described in any embodiment.

The embodiments of the present disclosure further provide a computer readable medium storing a computer program. The program, when executed by a processor, implements the method described in any embodiment.

The embodiments of the present disclosure further provide a server. The server includes: an interface; a storage device, storing one or more programs; and one or more processors, operatively connected to the interface and the storage device to: recognize a person name in a news text; search a video based on the person name, to obtain a to-be-selected video; extract a key frame in the to-be-selected video; recognize a person in the key frame to obtain identity information of the person; and determine the to-be-selected video as video material of news, in response to the identity information of the person conforming to the person name.

The embodiments of the present disclosure further provide a computer readable storage medium, storing a computer program. The computer program, when executed by one or more processors, causes the one or more processors to: recognize a person name in a news text; search a video based on the person name, to obtain a to-be-selected video; extract a key frame in the to-be-selected video; recognize a person in the key frame to obtain identity information of the person; and determine the to-be-selected video as video material of news, in response to the identity information of the person conforming to the person name.

Figure 6:
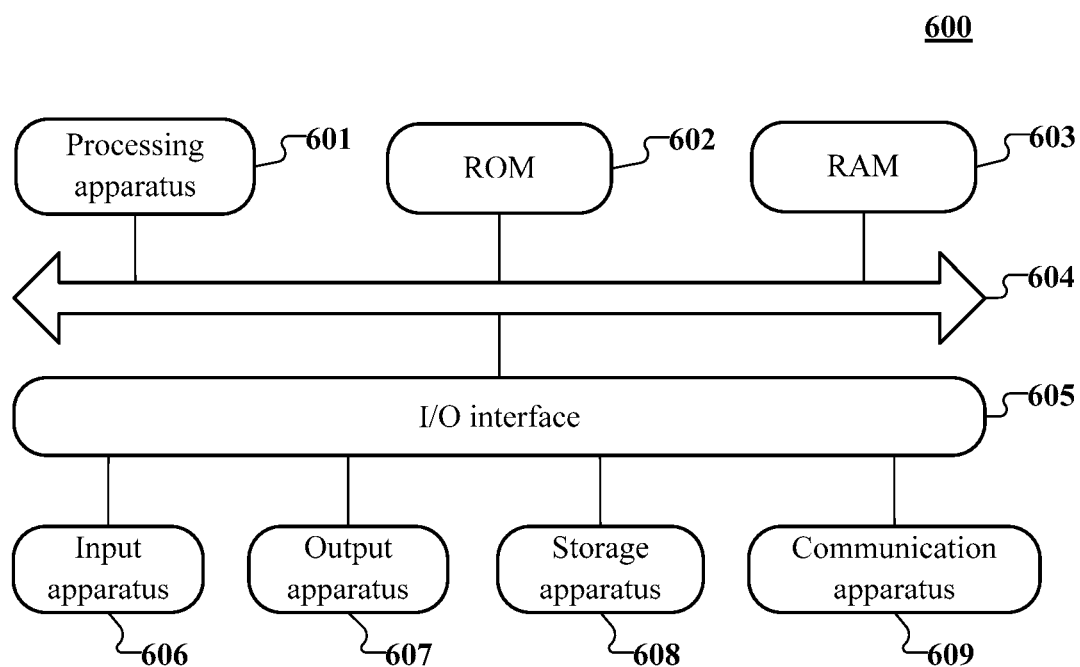
FIG. 6 is a schematic structural diagram of an electronic device/terminal/server adapted to implement embodiments of the present disclosure.

Referring to FIG. 6, FIG. 6 is a schematic structural diagram of an electronic device (e.g., the server or the terminal device shown in FIG. 1) 600 adapted to implement embodiments of the present disclosure. The terminal device in the embodiments of the present disclosure may include, but not limited to, a notebook computer and a desktop computer. The terminal device/server shown in FIG. 6 is merely an example, and should not bring any limitations to the functions and the scope of use of the embodiments of the present disclosure.

As shown in FIG. 6, the electronic device 600 includes a processing apparatus (e.g., a central processing unit and a graphics processing unit) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Usually, the following components are connected to the I/O interface 605: an input apparatus 606 including, for example, a touch screen, a touch pad, a keyboard, a mouse, a camera, a microphone, an accelerometer and a gyroscope; an output apparatus 607 including, for example, a liquid crystal display device (LCD), a speaker and a vibrator; a storage apparatus 608 including, for example, a tape and a hard disk; and a communication apparatus 609. The communication apparatus 609 may allow the electronic device 600 to exchange data through a wireless communication or a wired communication with other devices. Although FIG. 6 illustrates the electronic device 600 having various apparatuses, it should be understood that it is not required to implement or possess all of the illustrated apparatuses. More or less apparatuses may be alternatively implemented or possessed. Each of the blocks shown in FIG. 6 may represent one apparatus, or may represent a plurality of apparatuses as required.

In particular, according to the embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication apparatus 609, or may be installed from the storage apparatus 608, or may be installed from the ROM 602. The computer program, when executed by the processing apparatus 601, implements the above mentioned functionalities defined in the method of the embodiments of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, the command execution system, apparatus or element. The program codes contained on the computer readable medium may be transmitted with any suitable medium including, but not limited to, wireless, wired, optical cable, RF medium, or any suitable combination of the above.

The computer readable medium may be the computer readable medium included in the electronic device, or a stand-alone computer readable medium not assembled into the electronic device. The computer readable medium carries one or more programs. The one or more programs, when executed by the electronic device, cause the electronic device to: recognize a person name in a news text; search a video based on the person name, to obtain a to-be-selected video; extract a key frame in the to-be-selected video; recognize a person in the key frame to obtain identity information of the person; and determine the to-be-selected video as video material of news, in response to the identity information of the person conforming to the person name.

A computer program code for executing the operations according to the embodiments of the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequence shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks in the block diagrams and/or flowcharts may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor. For example, the processor may be described as: a processor comprising a text recognizing unit, a searching unit, an extracting unit, an identity recognizing unit and a determining unit. The names of these units do not in some cases constitute a limitation to such units themselves. For example, the text recognizing unit may alternatively be described as "a unit for recognizing a person name in a news text."

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A method for determining video material of news, comprising:
  recognizing a person name in a news text, wherein the recognizing a person name in a news text comprises:
    regarding a named entity recognition as a sequence labeling task; mapping token from a discrete one-hot representation into low-dimensional space to become dense embedding; inputting an embedding sequence of a sentence into a neural network; extracting feature using the neural network; and predicting a tag of each token using the neural network;

searching a video based on the person name, to obtain a to-be-selected video including a plurality of frames;

extracting a key frame in the to-be-selected video, the key frame being a frame selected from the to-be-selected video at an interval of a predetermined number of frames;

recognizing a person in the key frame to obtain identity information of the person; and determining the to-be-selected video as video material of news, in response to the identity information of the person conforming to the person name; and playing the video material of news when the news text is broadcasted.

2. The method according to claim 1, wherein the recognizing a person name in a news text includes:

recognizing the person name in the news text using named entity recognition; or recognizing the person name in the news text using a jieba word segmentation system.

3. The method according to claim 1, wherein the recognizing a person in the key frame to obtain identity information of the person includes:

recognizing voice, a body shape or a gait of the person in the key frame, to obtain the identity information of the person.

4. The method according to claim 1, further comprising:

segmenting, in response to a play duration of the video material of the news exceeding a play duration required by the news, the video material of the news based on a video frame having a changed scene in the video material of the news; and updating the video material of the news using the segmented video material.

5. The method according to claim 1, wherein the news text includes: a full text of the news and/or a summary paragraph in the full text of the news.

6. The method according to claim 1, wherein the recognizing a person name in a news text comprises: for a given sentence: performing a character observation, solving a character token for each segmented word, performing a maximum matching on the character token, and performing a word segmentation, to obtain a segmentation result as a final recognition result, wherein a Viterbi algorithm is used to solve the character token for each segmented word, and the word segmentation is performed using the Viterbi algorithm.

7. An apparatus for determining video material of news, comprising:

a text recognizing unit, configured to recognize a person name in a news text, wherein the recognizing a person name in a news text comprises: regarding a named entity recognition as a sequence labeling task; mapping token from a discrete one-hot representation into low-dimensional space to become dense embedding; inputting an embedding sequence of a sentence into a neural network; extracting feature using the neural network; and predicting a tag of each token using the neural network;

a searching unit, configured to search a video based on the person name, to obtain a to-be-selected video including a plurality of frames;

an extracting unit, configured to extract a key frame in the to-be-selected video, the key frame being a frame selected from the to-be-selected video at an interval of a predetermined number of frames;

an identity recognizing unit, configured to recognize a person in the key frame to obtain identity information of the person; and a determining unit, configured to determine the to-be-selected video as video material of news, in response to the identity information of the person conforming to the person name; and a playing unit, configured to play the video material of the news when the news text is broadcasted.

8. The apparatus according to claim 7, wherein the text recognizing unit is further configured to:

recognize the person name in the news text using named entity recognition; or recognize the person name in the news text using a jieba word segmentation system.

9. The apparatus according to claim 7, wherein the identity recognizing unit is further configured to:

recognize voice, a body shape or a gait of the person in the key frame, to obtain the identity information of the person.

10. The apparatus according to claim 7, further comprising:

a segmenting unit, configured to segment, in response to a play duration of the video material of the news exceeding a play duration required by the news, the video material of the news based on a video frame having a changed scene in the video material of the news; and an updating unit, configured to update the video material of the news using the segmented video material.

11. The apparatus according to claim 7, wherein the news text recognized in the text recognizing unit includes: a full text of the news and/or a summary paragraph in the full text of the news.

12. A server, comprising: an interface;

a storage device, storing one or more programs; and one or more processors, operatively connected to the interface and the storage device to: recognize a person name in a news text, wherein the recognizing a person name in a news text comprises: regarding a named entity recognition as a sequence labeling task; mapping token from a discrete one-hot representation into low-dimensional space to become dense embedding; inputting an embedding sequence of a sentence into a neural network; extracting feature using the neural network; and predicting a tag of each token using the neural network; search a video based on the person name, to obtain a to-be-selected video including a plurality of frames; extract a key frame in the to-be-selected video, the key frame being a frame selected from the to-be-selected video at an interval of a predetermined number of frames; recognize a person in the key frame to obtain identity information of the person; determine the to-be-selected video as video material of news, in response to the identity information of the person conforming to the person name; and play the video material of the news when the news text is broadcasted.

13. A non-transitory computer readable storage medium, storing a computer program, wherein the computer program, when executed by one or more processors, causes the one or more processors to: recognize a person name in a news text, wherein the recognizing a person name in a news text comprises: regarding a named entity recognition as a sequence labeling task; mapping token from a discrete one-hot representation into low-dimensional space to become dense embedding; inputting an embedding sequence of a sentence into a neural network; extracting feature using the neural network; and predicting a tag of each token using the neural network; search a video based on the person name, to obtain a to-be-selected video including a plurality of frames; extract a key frame in the to-be-selected video, the key frame being a frame selected from the to-be-selected video at an interval of a predetermined number of frames; recognize a person in the key frame to obtain identity information of the person; determine the to-be-selected video as video material of news, in response to the identity information of the person conforming to the person name; and play the video material of the news when the news text is broadcasted.

\* \* \* \* \*